(12) United States Patent
Hung et al.

(10) Patent No.: US 11,349,325 B2
(45) Date of Patent: May 31, 2022

(54) TEMPERATURE DEPENDENT CURRENT AND PULSE CONTROLLED CHARGING METHOD FOR A BATTERY CHARGER

(71) Applicant: PHIHONG TECHNOLOGY CO., LTD., Taoyuan (TW)

(72) Inventors: Ming-Huang Hung, Taoyuan (TW); Mu-Hsun Chen, Taoyuan (TW); Chien-Nan Chen, Taoyuan (TW); Yu-Sheng Yeh, Taoyuan (TW); Po-Chi Hung, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 190 days.

(21) Appl. No.: 16/705,250

(22) Filed: Dec. 6, 2019

(65) Prior Publication Data
US 2021/0066946 A1 Mar. 4, 2021

(30) Foreign Application Priority Data
Sep. 3, 2019 (TW) .................. 108131731

(51) Int. Cl.
*H02J 7/00* (2006.01)
(52) U.S. Cl.
CPC ...... *H02J 7/00714* (2020.01); *H02J 7/00309* (2020.01); *H02J 7/007182* (2020.01); *H02J 7/007192* (2020.01); *H02J 7/0068* (2013.01); *H02J 7/00711* (2020.01); *H02J 7/007194* (2020.01)

(58) Field of Classification Search
CPC ..... H02J 7/00714; H02J 7/007; H02J 7/00712
See application file for complete search history.

(56) References Cited

U.S. PATENT DOCUMENTS

| | | | | |
|---|---|---|---|---|
| 5,408,170 | A * | 4/1995 | Umetsu | H02J 7/0086 320/148 |
| 5,686,812 | A * | 11/1997 | Hotta | B60L 53/14 320/134 |
| 8,907,631 | B1 * | 12/2014 | Gurries | H02J 7/0077 320/138 |
| 9,035,623 | B1 * | 5/2015 | Berkowitz | H02J 7/007 320/164 |
| 2003/0071599 | A1 * | 4/2003 | Yoo | G01R 31/36 320/132 |
| 2007/0188134 | A1 * | 8/2007 | Hussain | H02J 7/007182 320/114 |

(Continued)

*Primary Examiner* — David V Henze-Gongola
*Assistant Examiner* — Tarikh Kanem Rankine
(74) *Attorney, Agent, or Firm* — WPAT, PC

(57) ABSTRACT

A pulse controlled charging method for higher temperature charging in addition to the current-reducing operation at ambient temperature. A specific software control strategy for these purposes is proposed, which can be divided into two parts, (a) two-stage charging current control at ambient temperature, which sets different current-limiting transient points for chargers with different outputs; (b) high-temperature pulse charging, which utilizes an internal NTC (Negative temperature coefficient) thermistor inside the charger to detect the internal temperature of the charger, if the temperature exceeds a pre-determined value, the charging process will be stopped for a period of time to avoid the temperature of the charger becoming too high.

9 Claims, 5 Drawing Sheets

(56) References Cited

U.S. PATENT DOCUMENTS

| | | | |
|---|---|---|---|
| 2008/0094036 A1* | 4/2008 | Yamashita | H02J 7/0071 320/162 |
| 2009/0121685 A1* | 5/2009 | Eto | H02J 7/0091 320/152 |
| 2011/0057624 A1* | 3/2011 | Rizzo | H02J 7/0069 320/152 |
| 2012/0139482 A1* | 6/2012 | Zhang | H02J 7/007194 320/107 |
| 2015/0130419 A1* | 5/2015 | Zhai | H02J 7/007 320/112 |
| 2015/0137741 A1* | 5/2015 | Gurries | H02J 7/0077 320/107 |
| 2017/0187199 A1* | 6/2017 | Wei | H02J 7/007 |
| 2017/0187218 A1* | 6/2017 | Thomsen | H02J 7/00 |

* cited by examiner

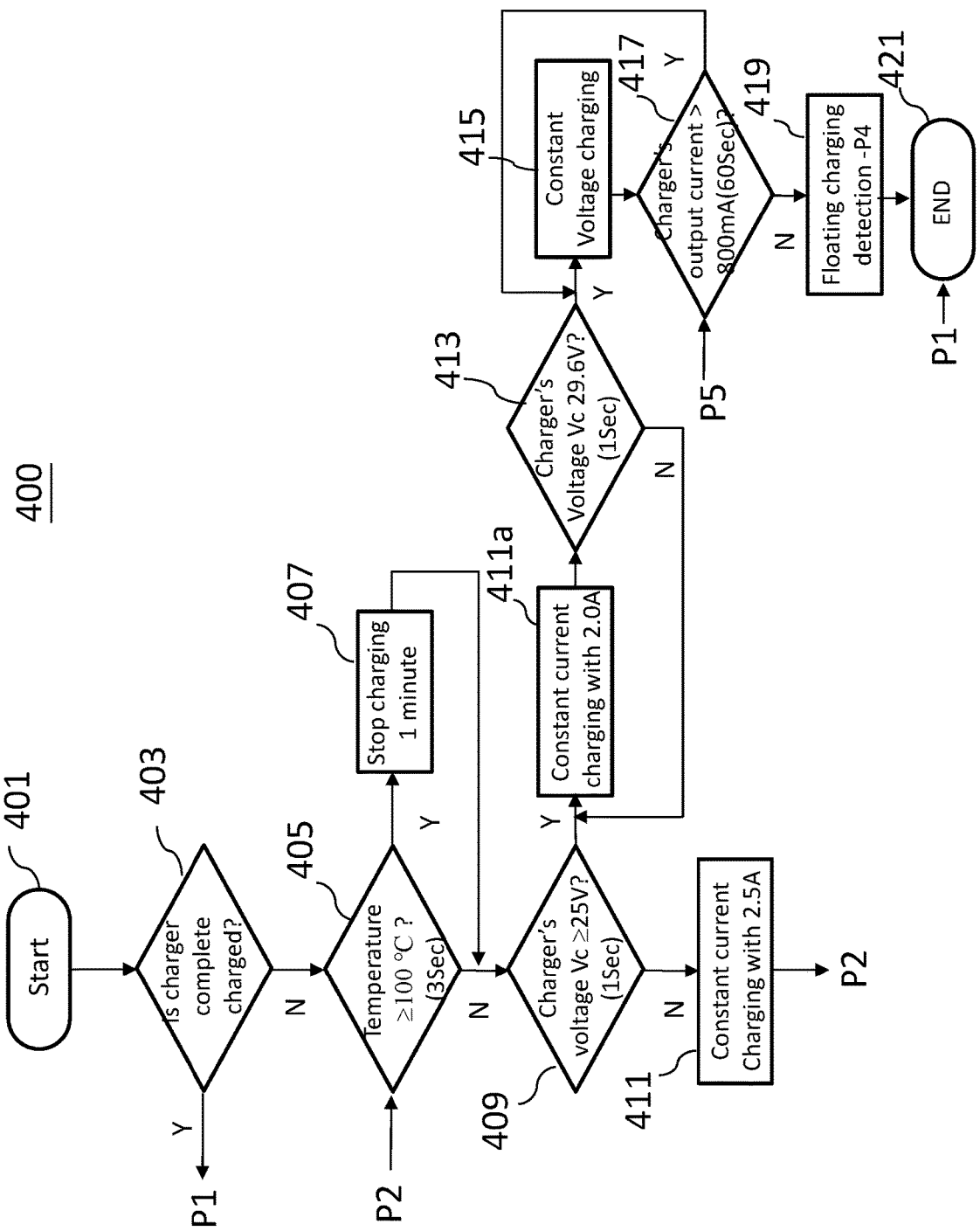

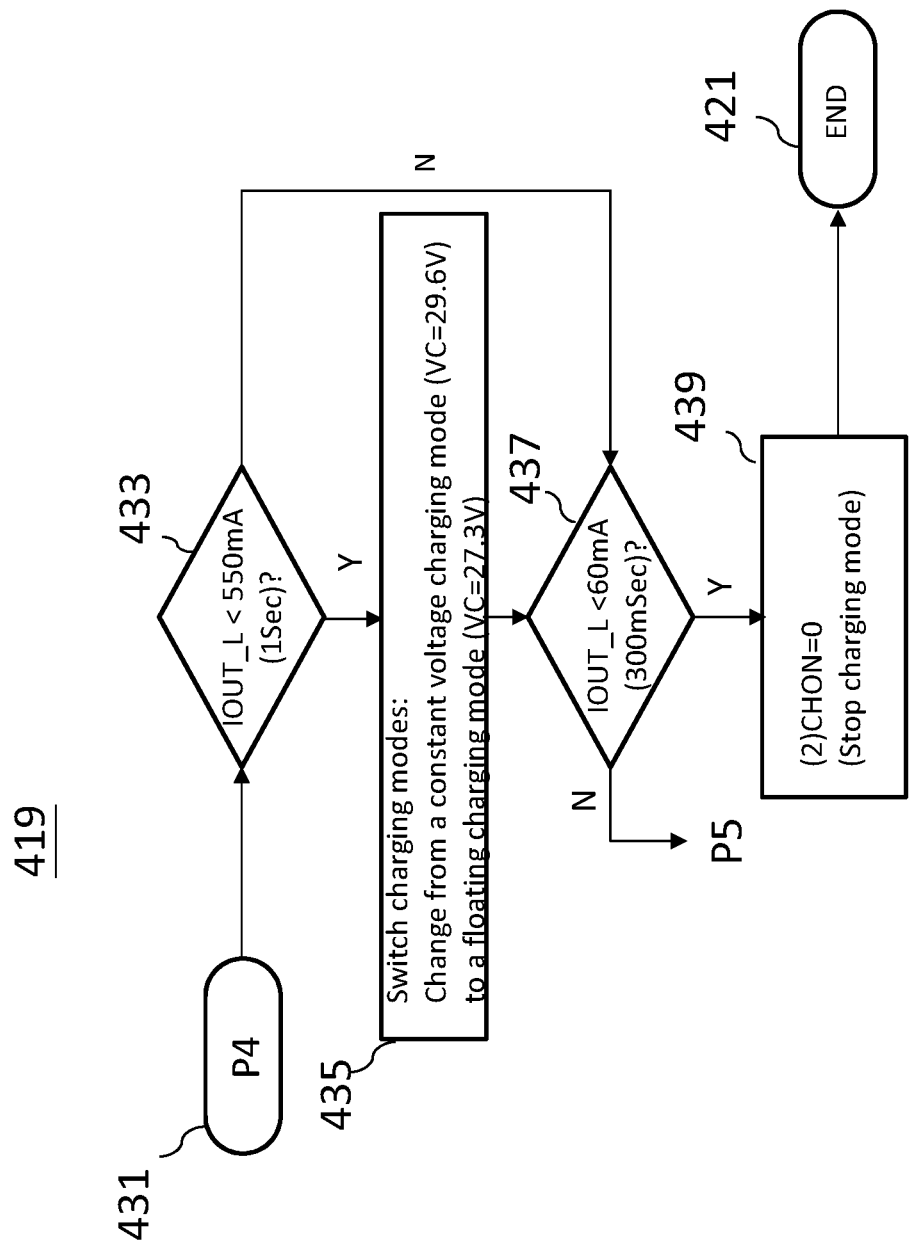

under the protection of the patent
TEMPERATURE DEPENDENT CURRENT AND PULSE CONTROLLED CHARGING METHOD FOR A BATTERY CHARGER

CROSS-REFERENCE TO RELATED APPLICATION

The present application is based on, and claims priority from, Taiwan Patent Application Serial Number 108131731, filed Sep. 3, 2019, the disclosure of which is hereby incorporated by reference herein in its entirety.

TECHNICAL FIELD

The present invention relates to a charging method for a battery charger, and more particularly, a temperature dependent current and pulse controlled charging method for a battery charger.

BACKGROUND

During the charging process, if the battery is overheated, the charging efficiency of the charger will be decreased and the battery's life will be shortened. To prevent this from happening, current solution is utilizing a temperature sensor to detect the electronic device inside the charger during a charging process. When the detected temperature of the charger's internal electronic device is higher than a preset temperature, the charging process is interrupted, otherwise reducing charging current of the charger for preventing battery in the electronic device been damaged by excessively high temperature.

Above strategy for reducing temperature of a electronic charging device (battery charger) by lowering charging current is commonly used in nowadays. However, it has to meet stricter energy-saving regulations for electrical appliances especially for chargers in electric assisted vehicles, for example, California Energy Commission (CEC) and the Rehabilitation Engineering and Assistive Technology Society of North America (RESNA) 7176, which require chargers in electric assisted vehicles having 8 hour 80% charging efficiency specification at ambient temperature.

Reducing the temperature of charger's internal component during a current-reducing charging operation at ambient temperature can enhance the reliability of the battery charger, for example at 50° C. ambient temperature. Therefore, the requirements of heat sink and thermal greases can be greatly reduced. To reach this goal, settings for current-reducing charging at ambient temperature need considering both the temperature of the charger's component and charger's charging efficiency. Thus, for higher temperature charging, considering only the current-reducing of the charger is not enough. In view of this, the present invention proposes a pulse controlled charging method for higher temperature charging in addition to the current-reducing charging at ambient temperature for further improving the charging efficiency.

The present application adopts a software control strategy to control the temperature of the charger transformer and its internal transistor within the derated range of specification without increasing the hardware cost of the charger, so that it can pass the requirements of production compliance.

SUMMARY

The purpose of the present invention is to provide a method for charging a battery, which includes providing a charger circuit, measuring temperature of interior component of the charger, measuring the output voltage of the charger, measuring the output current of the charger; if the temperature is greater than or equal to a preset value and lasts for a first period of time then stop charging the battery for a second period of time; if the output voltage is less than a first threshold voltage and lasts for a third period of time then charge the battery with a first fixed current value; if the output voltage is between the first and a second for a fourth period of time then charge the battery with a second fixed current value; if the output voltage is greater than or equal to the second threshold voltage then charge the battery in the constant voltage mode; if the output current is less than a preset current value and lasts for a fifth period of time then enters the floating charging mode.

In one preferred embodiment, the floating charging detection process comprises checking whether the output current of the charger is less than a second preset current value and lasts for a sixth period of time, if the output current of the charger is less than a second predetermined current value and lasts for the sixth period of time then the charger switches into a floating charging mode from the constant voltage charging mode through operating the charger's circuit and checking whether the output current of the charger is less than a third preset current value and lasts for a seventh period of time, if the output current of the charger is less than the third preset current value and lasts for the seventh period of time, the charger switches to operate at stopping charging mode from the constant voltage charging mode, and then ends the charging procedure, otherwise the charger goes back to perform the floating charging detection process.

In one preferred embodiment, the charger circuit includes a power conversion unit and a charging control circuit electrically coupled to the power conversion unit, wherein the charging control circuit includes a switching circuit, a microcontroller unit electrically connected to the switching circuit, and a constant current/constant voltage loop electrically connected to the microcontroller unit, wherein the charging control circuit is arranged for providing a battery electrically connected to it and utilizes the power conversion unit to manage a charging control for the battery, and wherein the microcontroller unit can detect the charger's output voltage, output current, and temperature of its internal component for adjusting its charging procedure.

BRIEF DESCRIPTION OF THE DRAWINGS

The components, characteristics and advantages of the present invention may be understood by the detailed descriptions of the preferred embodiments outlined in the specification and the drawings attached:

FIG. 4(A) illustrates a specific operation flowchart of the charging strategy proposed in the present invention.

FIG. 4 (B) illustrates a specific operation flowchart of a floating charging method according to the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As described in the background section, present invention proposes a pulse controlled charging method for higher temperature charging in addition to the current-reducing operation at ambient temperature. A specific software control strategy for these purposes is proposed and can be divided into two parts: (a) two-stage charging current control at ambient temperature, which sets different current-limiting transient points for chargers with different outputs; (b) high-temperature pulse charging, which utilizes an internal NTC (Negative temperature coefficient) thermistor inside the charger to detect the internal temperature of the charger, if the temperature exceeds a pre-determined value, the charging process will be stopped for a period of time to avoid the temperature of the charger becoming too high.

Figure 1:
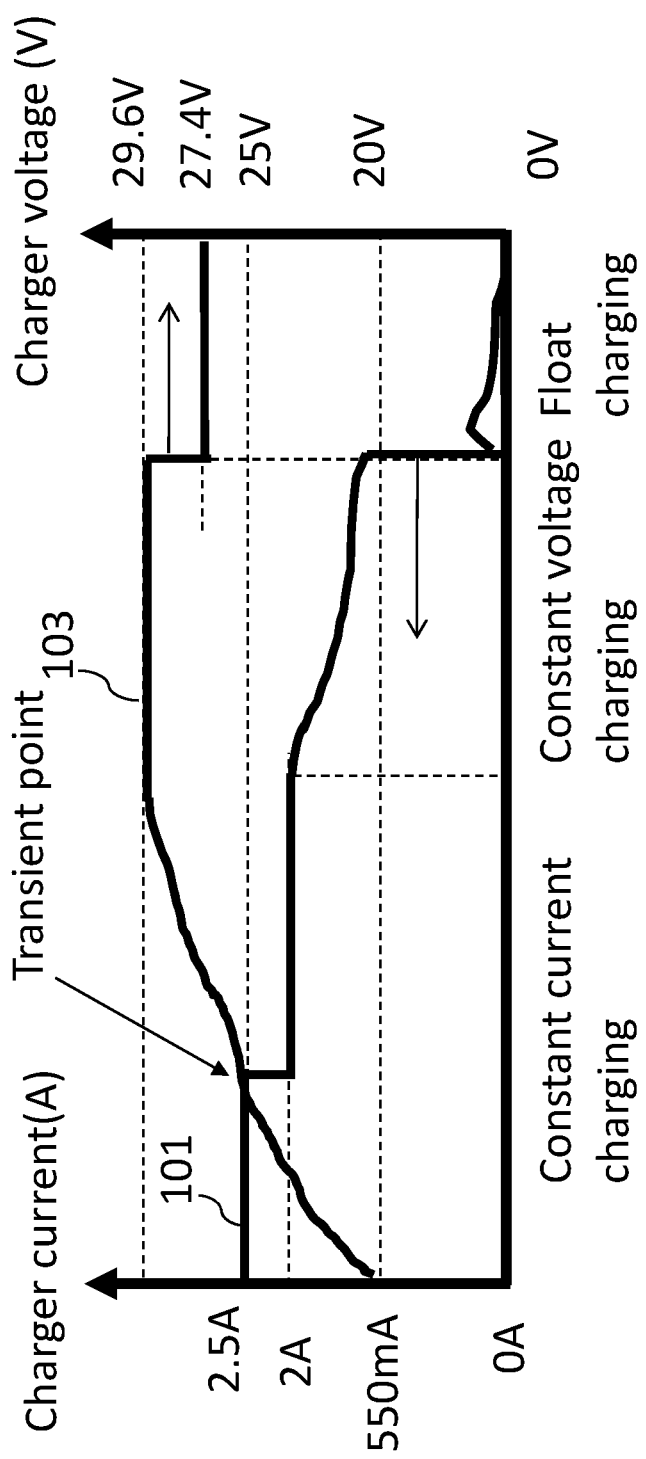
FIG. 1 illustrates a completed charging process for a commercial 2-cell battery by a 2.5 A battery charger utilizing charging strategy proposed in the present invention.
Figure 2:
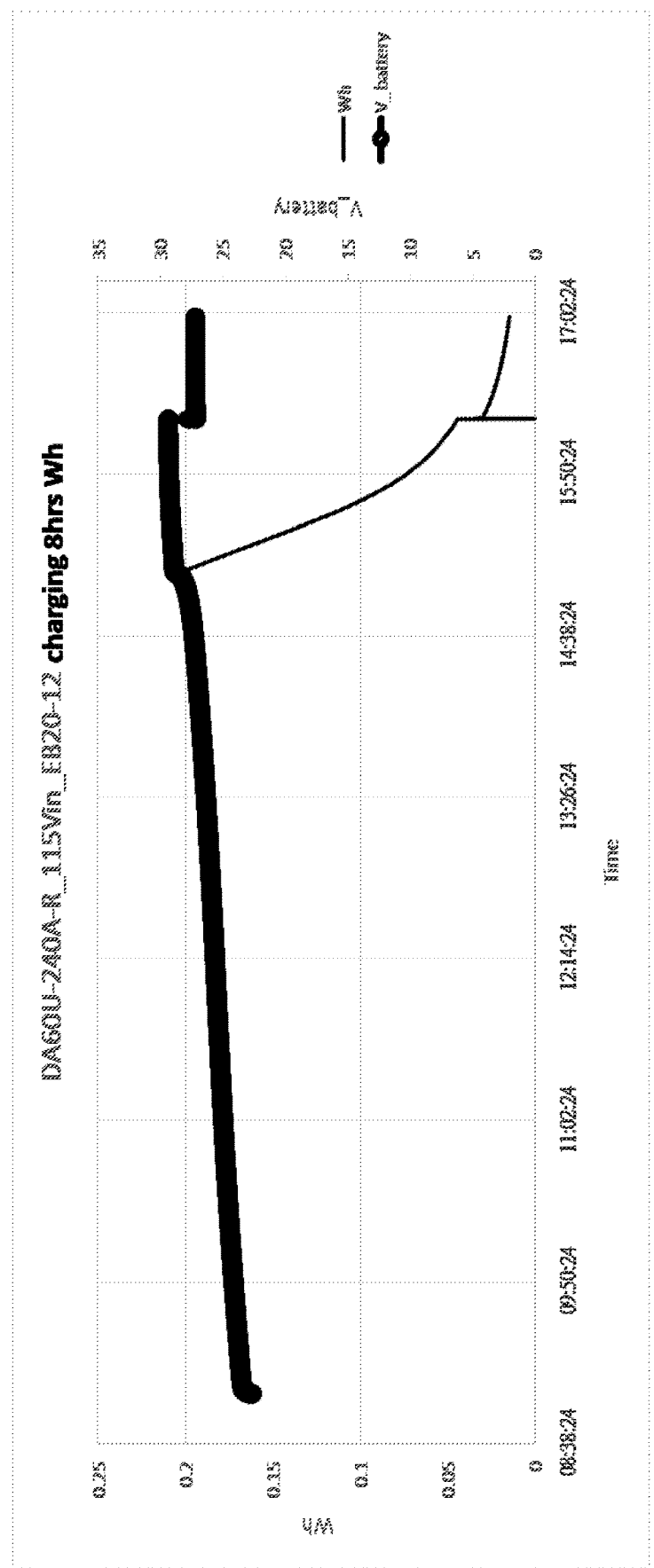
FIG. 2 illustrates a testing results for the commercial 2-cell battery by a 2.5 A battery charger after 8 hours of testing according to present invention.

Here we take a typical 2.5 A charger as an example to demonstrate how the above mentioned charging strategy worked. A lead-acid battery capacity required for the specification is confirmed first, which is listed as BB brand battery, model EB20-12, rated battery capacity 20 AHr (C/10), standard size or battery type 2 cell. FIG. 1 illustrates a completed charging process of the above 2-cell battery with output current (I_output) and output voltage (V_output). Curves 101 and 103 represents charger's output current (I_output) and output voltage (V_output), respectively. The overall charging process includes a constant current charging mode, a constant voltage charging mode, and a float charging mode. A current-limiting transient point (indicated by an arrow in FIG. 1) for charger can be set as described previously, which is set at charger's output voltage of 25V by reducing its output current reduced from 2.5 A to 2.0 A. After 8 hours of testing, the result is shown in FIG. 2, total charging power is 442.984 Wh while the 2-cell battery having power 480 Wh after charging completed, the charging efficiency at ambient temperature is 92.28%.

Figure 3:
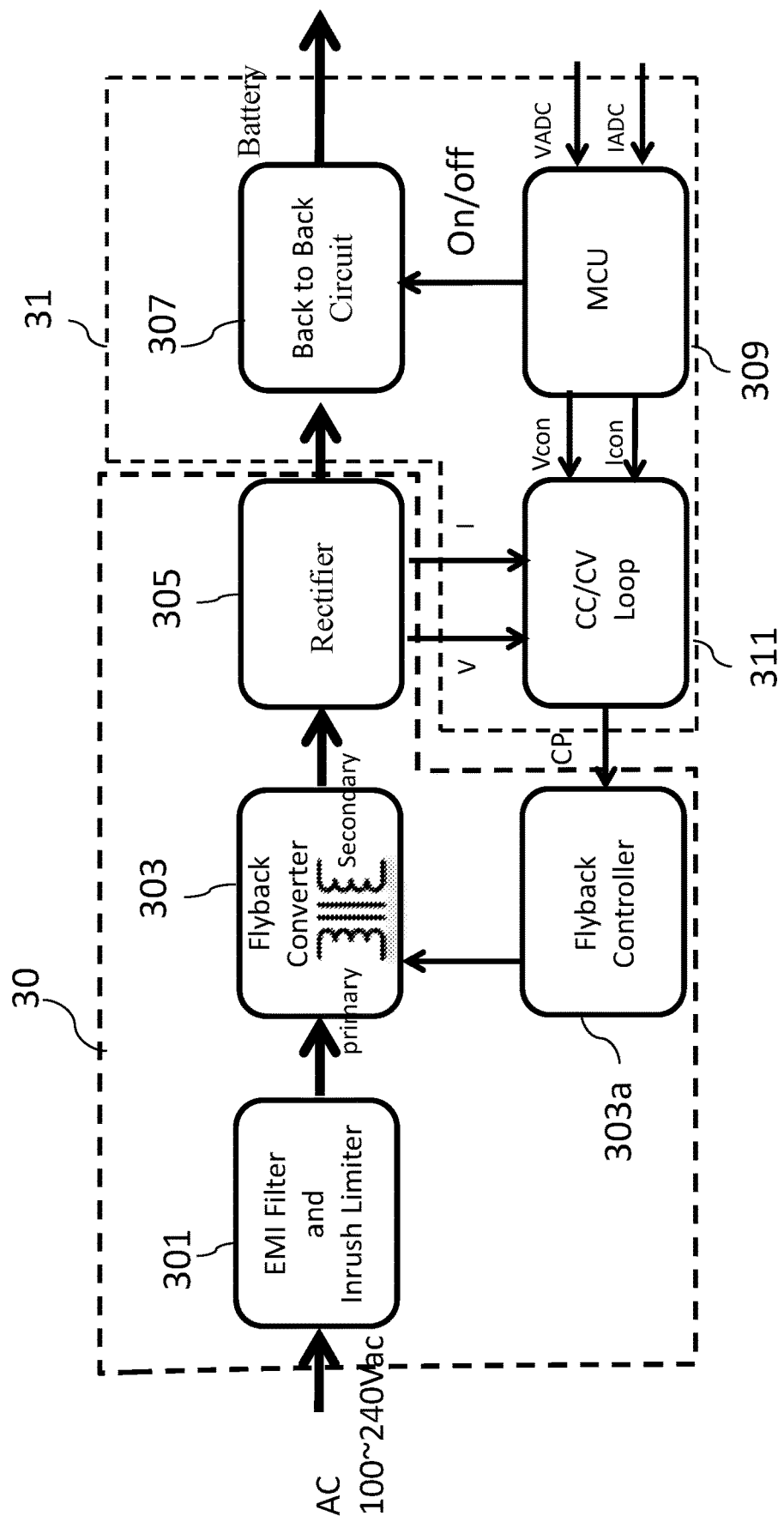
FIG. 3 illustrates the circuitry function block provided for the above charging procedure according to the present invention.

FIG. 3 shows the circuitry function block provided for the above charging procedure. As shown in FIG. 3, an AC input voltage (100-240 Vac) is rectified by an EMI filtering and inrush limiter 301 to form a DC voltage, then the DC voltage is fed to a transformer's primary side of a flyback converter 303, the DC output is fed into a rectifier 305 connected the secondary side of the transformer in the flyback converter 303, and energy storage is controlled through a flyback controller 303a. A power conversion unit 30 is consisted of the above mentioned EMI filter and inrush limiter 301, the flyback converter 303, the rectifier 305, and the flyback controller 303a. The DC output from the power conversion unit 30 charges the battery via a back to back switch circuit 307, which controls the on/off of the circuit based on the voltage and temperature detected by the microcontroller unit (MCU) 309, to regulate the output current of the battery. In one preferred embodiment, the MCU 309 can detect related parameters VADC and IADC, for example, battery voltage, charging current, internal temperature of the charger, etc., through its associated pins and can feed control signals Vcon and Icon to a constant current/constant voltage loop (CC/CV loop) 311. The constant voltage/constant current (CC/CV) loop 311 includes a low pass filter and a CC/CV feedback compensation amplifier (not shown), and can receive the control signals Icon and Vcon from MCU 309, respectively. The control signals Icon and Vcon that have been fed to the corresponding voltage loop feedback compensation operational amplifier and current loop feedback compensation operational amplifier (not shown) in the constant voltage/constant current (CC/CV) loop 311 are acted as input reference signals, which are compared with the actual I and V signals from the rectifier. The difference between input reference signals and the actual I and V signals from the rectifier can output as error signals, an output control signal CP outputs from the constant voltage/constant current (CC/CV) loop 311 is proportional to the obtained error signals, and the level of the CP can be adjusted by a negative feedback control. The flyback controller 303a adjusts the output voltage level of the flyback converter 303 according to the value of control signal CP. The back to back switch circuit 307, the MCU 309, and the constant voltage/constant current (CC/CV) circuit 311 together constitute a charge control circuit 31.

For further explaining the ambient temperature current-reducing and high temperature pulse-controlled charging strategy proposed by the present invention, FIG. 4(A) shows a specific operation flowchart 400 of the above charging strategy. Flowchart 400 begins with step 401, followed by a step 403 (detecting battery voltage by MCU 309 in accordance with FIG. 3) to determine if it is fully charged, and if it is fully charged, stop the charging procedure. Next, it is determined by step 405 (according to FIG. 3, the temperature of the charger component detected by the microcontroller 309) to check whether the temperature of the internal components (chips) of the charger is higher than 100° C. and lasts for 3 seconds, if it is higher than 100° C. and lasts for 3 seconds, go to step 407 to stop charging for 1 minute, that is, high temperature pulse charging, (according to FIG. 3, the back-to-back switch circuit 307 is controlled by the MCU 309), and then perform step 409 to determine whether the charger voltage is greater than or equal to 25V and lasts for 1 second (i.e., the current limiting transient point mentioned earlier), otherwise go to step 411 to charge the battery with a constant current of 2.5 A (according to FIG. 3, the constant voltage/constant current loop 311 is controlled by the MCU 309 to charge the battery in the constant current mode), and then returns to step 405. In step 409, if the charger voltage is greater than or equal to 25V for 1 second, performing step 411a to charge the battery with a constant current of 2.0 A, that is, a current-reducing process (according to FIG. 3, the constant current charging mode is determined by the MCU 309 by controlling the constant current/constant voltage loop 311). Next, in step 413, if the charger voltage is greater than or equal to 29.6V for 1 second (according to FIG. 3, charger voltage is detected by the MCU 309), otherwise returning to step 411a to charge the battery with a constant current of 2.0 A, if the charger voltage is greater than or equal to 29.6 V for 1 second, then performing step 415 to charge the battery at a constant voltage of 29.6V. Next, in step 417, it is to determine whether the charger voltage satisfies the floating charging condition, that is, whether the charger output current IOUT_L is greater than 800 mA and lasts for 60 seconds. If the answer is yes, return to step 415 to continue charging the battery at a constant voltage of 29.6 V. Otherwise, perform step 419 to charge the battery with the floating charging detection program-P4, and then ends the charging process at step 421.

FIG. 4(B) shows a specific operation flow chart 419 of a floating charging method. The flowchart 419 starts with step 431, and then at step 433 (according to FIG. 3, the MCU 309 detects the charger's output current IOUT_L) is to determine that whether the charger's output current IOUT_L is less than 550 mA for 1 second, if it is less than 550 mA for 1 second, performing step 435 to switch from the constant voltage charging mode to a floating charging mode, and then in step 437 (according to FIG. 3, the microcontroller 309 detects the charger output current. IOUT_L) determines whether the charger's output current IOUT_L is less than 60 mA and lasts for 300 microseconds, otherwise returns to P5 (ie, step 417 in FIG. 4A). In step 437, if the charger output current IOUT_L is less than 60 mA and lasts for 300 microseconds, the microcontroller sets the stop charging mode (CHON=0), and then ends the charging process 421.

In summary, the temperature dependent current and pulse controlled charging method for a battery proposed by the present invention has the advantages of lowering the temperature of the charger's components and increasing the reliability of the product, and the most remarkable effect is that it is a relatively simple way in meeting the requirement of ambient temperature over 50° C. and reducing the need for heat sinks and thermal greases.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for charging a battery comprising:
providing a charger circuit;
measuring temperature of interior component of the charger;
measuring the output voltage of the charger;
measuring the output current of the charger;
checking whether the temperature of the interior of the charger is greater than or equal to a preset temperature value and lasts for a first period of time, if the temperature of the interior of the charger is greater than or equal to the preset temperature value and lasts for the first period of time then stop charging the battery for a second period of time;
checking whether the output voltage of the charger is less than a first threshold voltage and lasts for a third period of time, if the output voltage of the charger is less than the first threshold voltage and lasts for the third period of time then charge the battery by a constant current charging mode with a first fixed current value;
checking whether the output voltage of the charger is between the first and a second voltage threshold for a fourth period of time, if the output voltage of the charger is between the first and the second threshold voltages for the fourth period of time then charge the battery by the constant current charging mode with a second fixed current value;
checking whether the output voltage of the charger is greater than or equal to the second threshold voltage, if the output voltage of the charger is greater than or equal to the second threshold voltage then charge the battery in a constant voltage charging mode with the second threshold voltage; and
checking whether the output current of the charger is less than a first preset current value and lasts for a fifth period of time, if the output current of the charger is less than the first preset current value and lasts for the fifth period of time then the charger enters into a floating charging detection process.

2. The method of claim 1, wherein the floating charging detection process comprising:
checking whether the output current of the charger is less than a second preset current value and lasts for a sixth period of time, if the output current of the charger is less than a second predetermined current value and lasts for the sixth period of time then the charger switches into a floating charging mode from the constant voltage charging mode through operating the charger's circuit; and
checking whether the output current of the charger is less than a third preset current value and lasts for a seventh period of time, if the output current of the charger is less than the third preset current value and lasts for the seventh period of time, the charger switches to operate at stopping charging mode from the constant voltage charging mode, and then ends the charging procedure, otherwise the charger goes back to perform the floating charging detection process.

3. The method of claim 1, wherein the charger circuit comprising:
a power conversion unit; and
a charging control circuit electrically coupled to the power conversion unit, wherein the charging control circuit includes:
a switching circuit;
a microcontroller unit electrically connected to the switching circuit; and
a constant current/constant voltage loop electrically connected to the microcontroller unit, wherein the charging control circuit is arranged for providing a battery electrically connected to it and utilizes the power conversion unit to manage a charging control for the battery; and
wherein the microcontroller unit can detect the charger's output voltage, output current, and temperature of its internal component for adjusting its charging procedure.

4. The method of claim 1, wherein the preset temperature value is 100° C.

5. The method of claim 1, wherein the first period of time is 3 seconds, the second period of time is 1 minute, the third period of time is 1 second, the fourth period of time is 1 second, and the fifth period of time is 1 minutes.

6. The method of claim 2, wherein the sixth period of time is 1 second, and the seventh period of time is 300 microseconds.

7. The method of claim 1, wherein the first threshold voltage is 25 volts, and the second threshold voltage is 29.6 volts.

8. The method of claim 1, wherein the first fixed current value is 2.5 A, the second fixed current value is 2 A, and the first preset current value is 800 mA.

9. The method of claim 2, wherein the second preset current value is 550 mA, and the third preset current value is 60 mA.

* * * * *